United States Patent [19]

Simon

[11] 4,140,482

[45] Feb. 20, 1979

[54] DEVICE FOR THE ACOUSTIC DAMPING OF A RADIANT-HEATING TUBE FOR AN INDUSTRIAL FURNACE

[75] Inventor: Horst Simon, Kettwig, Fed. Rep. of Germany

[73] Assignee: Ludwig-Ofag-Indugas Industrieofenanlagen GmbH, Essen, Fed. Rep. of Germany

[21] Appl. No.: 812,432

[22] Filed: Jul. 1, 1977

[30] Foreign Application Priority Data

Jul. 2, 1976 [DE] Fed. Rep. of Germany ....... 2629962

[51] Int. Cl.² ............................................... F27B 5/14
[52] U.S. Cl. ................................ 432/209; 126/91 A; 432/214
[58] Field of Search .............. 126/91 A; 432/209, 214

[56] References Cited
U.S. PATENT DOCUMENTS

| | | | |
|---|---|---|---|
| 2,226,816 | 12/1940 | Hepburn | 126/91 A |
| 2,255,540 | 9/1941 | Dreffein | 126/91 A |
| 4,047,881 | 9/1977 | Eschenauer et al. | 126/91 A |

*Primary Examiner*—John J. Camby
*Attorney, Agent, or Firm*—Karl F. Ross

[57] ABSTRACT

A fuel-fired radiant-heating tube for an industrial furnace is provided, at its fuel-feed end externally of the furnace, with an acoustic damper or muffler which comprises a double-wall housing defining two elongated annular flow passages in indirect heat-exchanging relationship through a thermally conductive inner wall. The combustion exhaust gases are conducted through one of these passages while combustion-sustaining gas, e.g. air, is supplied through the other in counterflow to the exhaust gas, thereby preheating the air. The outer wall is provided with acoustic and/or thermal insulation while at least one of the passages is provided with sound-damping elements, e.g. vanes for baffling the flow through this passage.

6 Claims, 3 Drawing Figures

DEVICE FOR THE ACOUSTIC DAMPING OF A RADIANT-HEATING TUBE FOR AN INDUSTRIAL FURNACE

FIELD OF THE INVENTION

The present invention relates to a sound-damping device for a radiant-heating tube for an industrial furnace and, more particularly, to a fuel-fired radiant-heating tube provided with an outlet for combustion exhaust gases.

BACKGROUND OF THE INVENTION

It is a common practice in some industrial ovens or furnaces to provide fuel-fired radiant-heating tubes which extend into the furnace and have, at an end external of the furnace, an outlet for the combustion exhaust gas. Such tubes are supplied with fuel and combustion-sustaining gas, e.g. air, and are heated by a combustion process within the tube.

Customarily, the fuel is delivered by a pipe extending axially through the heating tube while the combustion-sustaining air is delivered by a fitting at the aforementioned end of the heating tube to a space surrounding the fuel-supply pipe and defined by a further duct, tube or sleeve which defines another annular passage outwardly of this duct, i.e. between the duct and the wall of the heating tube, through which the exhaust gas of the combustion process is led in the opposite direction to the aforementioned outlet.

In other words, the fuel and combustion-sustaining gas are led through inner coaxial paths through the tube from the end thereof which extends out of the furnace wall, sustain combustion within the tube to produce hot exhaust gases, and the latter exhaust gases are diverted back again in an outer passage toward the end of the tube projecting through the furnace wall to be discharged from an outlet outside the furnace. The combustion air is in heat-exchanging relationship with the exhaust gases along the aforementioned duct which can be a thin-wall metal member or some other body of heat-conducting material.

As a consequence, the heating tube is provided with a recuperative heater whereby a portion of the exhaust gas heated is transferred to the combustion-sustaining gas within the heating tube.

The internal recuperative preheating effect is seldom sufficient to permit effective recovery of available heat of the exhaust gas, especially when the recuperative process is carried out over a length of the heating tube corresponding to the wall thickness of the furnace and such wall thickness is limited. In addition the exhaust gas emerging from the aforementioned end of the heating tube is a noise generator of considerable significance, the operation of this system being therefore detrimental to the environment and deleterious to operating personnel.

OBJECTS OF THE INVENTION

It is the principal object of the present invention, therefore, to provide a device for reducing the sound output of a fuel-fired radiant-heating tube for industrial applications of the aforedescribed type.

Another object of the present invention is to improve upon the heat efficiency of such a heating tube.

SUMMARY OF THE INVENTION

According to the invention, an acoustic damper is provided in the form of a sound-muffling device which simultaneously serves to effect preheating of the combustion air at the end of the heating tube projecting from the furnace wall. By baffling the outflow of the exhaust gas in such a muffler and simultaneously cooling the exhaust gas by heat transfer to the combustion air to reduce the velocity of the exhaust gas for a given volume rate of flow at the outlet of the radiant-heating tube, it is possible to obtain significant acoustic damping and improvement in thermal efficiency.

More specifically, the invention provides a fuel-fired radiant-heating tube for industrial application of the type described and, connected to the outlet for the exhaust gas at the end of this tube, a double-wall housing having an outer shell, an inner shell, an elongated annular passage or space between the outer shell and the inner shell, and an elongated core passage within the inner shell. The inner shell is constituted as a thermally conductive material, e.g. metal.

One of these passages, i.e. the annular passage or the core passage, is constituted as a recuperative air preheater while the other is constituted as an acoustic damper or muffler with sound-damping baffles which can also serve as thermally conductive elements for increasing the indirect heat exchange between the exhaust gas and the air to be preheated.

Either of these passages can be provided with inlet and outlet fittings for connection in the air supply path while the other is provided with fittings connecting it to the exhaust gas path.

In a preferred embodiment of the invention, the annular passage is formed as the sound-damping chamber while the core passage is provided as the air preheater. The thermally conductive acoustic-damping elements are then preferably radially extending vanes which are fixed upon the inner shells and which are designed to reduce turbulence and hence acoustic emissions of the exhaust gas to a surprisingly low level.

According to another feature of the invention, the radial lamellae or vanes are disposed in axially spaced arrays and are angularly equispaced within each array, the vanes of adjacent arrays being angularly offset from one another.

The outer shell is advantageously formed with an insulating sheath capable of reducing thermal losses from the muffler and additionally reducing the acoustic output of the device.

For optimum air preheating, it has been found to be advantageous to guide the air to be preheated as much as possible along the heated walls, i.e. the inner shell, by disposing within the core passage, a core tube or body so that the core passage is also an annular passage.

A filling can be provided within the core passage and is preferably a packing of wire-screen strips which can be corrugated, the corrugations running in the flow direction.

When the core body is formed as a tube or other hollow structure, it can define a flow passage which can be traversed in parallel by the gas flowing through the outer or annular passage. The resulting structure is especailly simple and efficient and has been found to give best results when the shells and bodies described are coaxial with one another.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
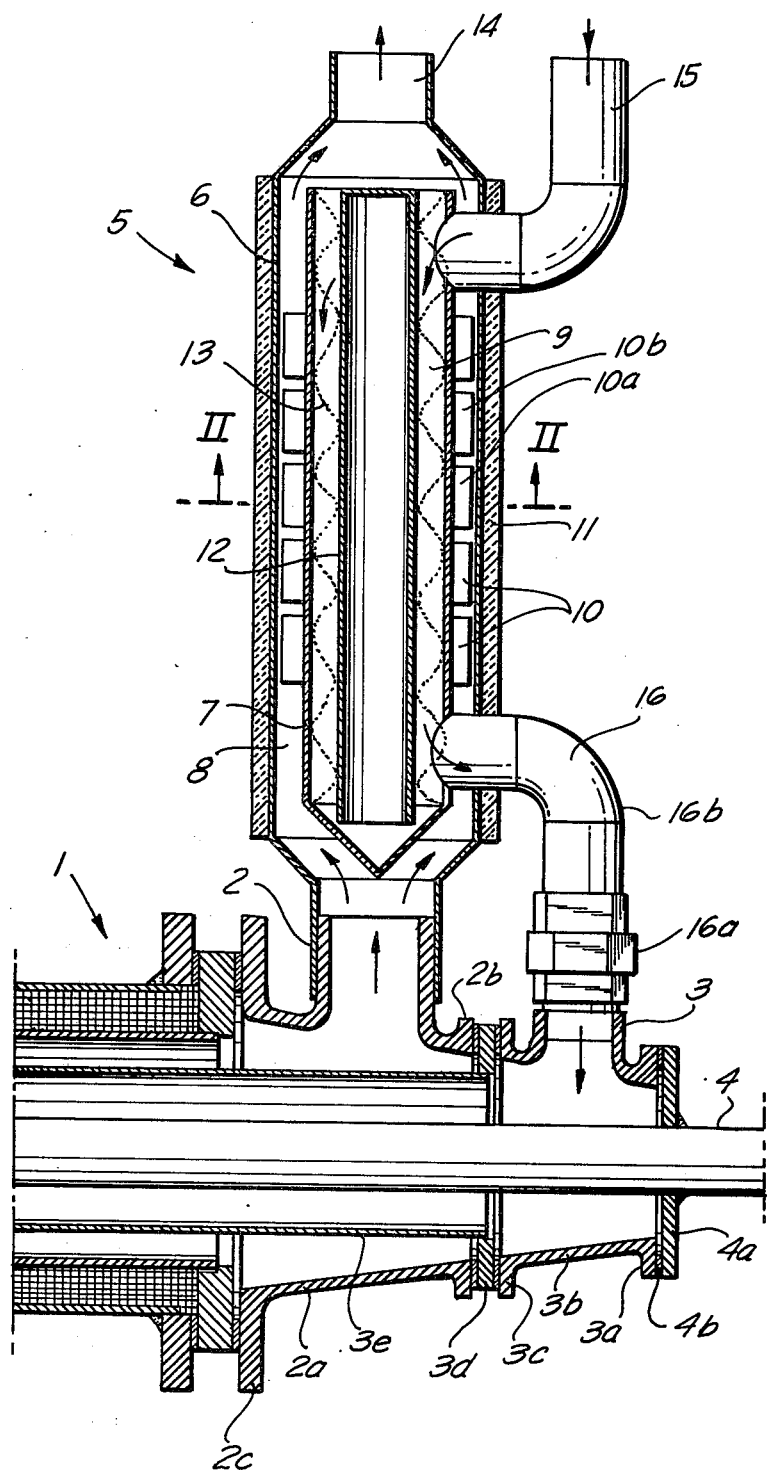
FIG. 1 is a longitudinally cross-sectional view through the structure according to the invention at one end of a radiant-heating fuel-fired tube for an industrial furnace.
Figure 2:
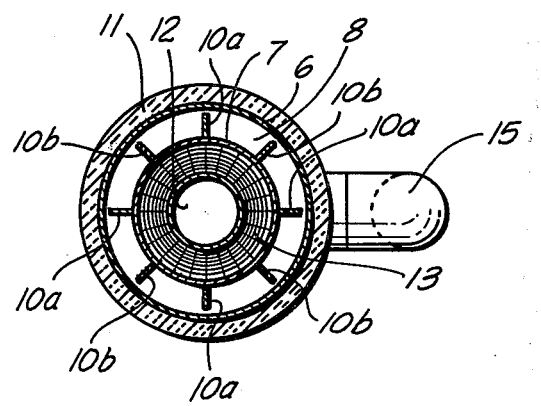
FIG. 2 is a cross-sectional view taken along the line II — II of FIG. 1.

An acoustic-damping arrangement for a fuel-fired radiant-heating tube for an industrial furnace comprises, as illustrated in FIGS. 1 and 2, the heating tube, one end of which is shown at 1 in FIG. 1, the tube being otherwise conventional in the art.

The tube 1 is formed at its fuel-feed end, with an exhaust gas fitting or outlet 2 which is disposed externally of the industrial furnace and a combustion air inlet fitting 3 as well as a fuel-feed line 4. In the embodiment illustrated, the fuel-feed line 4, which can deliver a hydrocarbon gas or fuel oil to the combustion location within the tube, but not shown in the drawing, extends axially through the tube 1 and is welded to a flange 4a which can be bolted via seal 4b to a flange 3a of a housing 3b conically diverging in the direction of fuel feed.

The housing 3b, which coaxially surrounds the pipe 4 carries the fitting 3 which can be connected, in turn, by a union 16a and an elbow 16b to the combustion air outlet of a preheating unit represented generally at 5 and described in greater detail below.

At the broad end of the housing 3b, a flange 3c connects it to a flange 3d of an axially extending air duct 3e which coaxially surrounds the pipe 4 so that heat from the preheated air can be transferred, via the wall of the pipe 4 to the fuel traversing same.

The radial fitting 2 is formed, in turn, upon a housing 2a which also diverges axially in the direction of fuel feed, this housing having a flange 2b connected to the flange 3d and a further flange 2c which connects the housing to the remainder of the heating tube assembly and ultimately to the wall of the furnace.

The acoustic damping preheater of the present invention, which reduces the noise output of the furnace by damping the sound generated by the exhaust gas discharged from fitting 2 comprises, according to the invention, a double-wall housing having an outer wall 6 and an inner wall 7 spaced from the outer wall 6 and coaxial therewith. The annular space 8 between the inner and outer walls 7, 6 is connected to the fitting 2 so that the hot exhaust gases pass between these walls to the opposite end of the unit 5 at which the gases are discharged in the direction of the arrows through a central outlet 14.

Within the inner wall 7, there is provided a core tube 12 which defines an annular space 9 through which the combustion air can be passed for preheating. A combustion air inlet 15 thus passes through the outer wall 6 and communicates with the annular space 9 around the core tube 12 while the outlet 16 previously mentioned connects the opposite end of the space 9 with the fitting 3.

One of the spaces 8, 9 at least (usually the annular space 8), is formed as an acoustic damper while the other space is constituted as a recuperative air preheated. In other words, it is possible in accordance with the invention to feed the combustion gas to the inner space 9 and discharge this gas therefrom while the air to be heated is passed through the other space 8.

In either case, the acoustic damper is formed by the chamber which is traversed by the exhaust gas. In the embodiment illustrated, the acoustic damper is formed in the chamber or space 8 while sound-damping elements 10 here shown to be radial vanes 10a, 10b, angularly equispaced about the periphery of the inner wall 7 and welded thereto. The vanes 10a, 10b are disposed in axially spaced arrays with the vanes of adjacent arrays being angularly offset midway between the vanes of an adjacent array. The vanes extend substantially entirely across the width of the space or chamber 8.

The outer wall or shell 6 of the sound-damping preheating unit 5 is provided with a thermally insulating layer 11. The chamber 9 for preheating of the combustion air can also be provided with vanes or other sound-damping and heat-exchange promoting elements as illustrated for the vanes 10a, 10b of FIG. 1, in which case the vanes are applied to the tube 12. Alternatively and in a preferred embodiment of the invention, however, the elements within the space 9 are constituted by wire-mesh strips or webs 13 corrugated in the flow direction.

Figure 3:
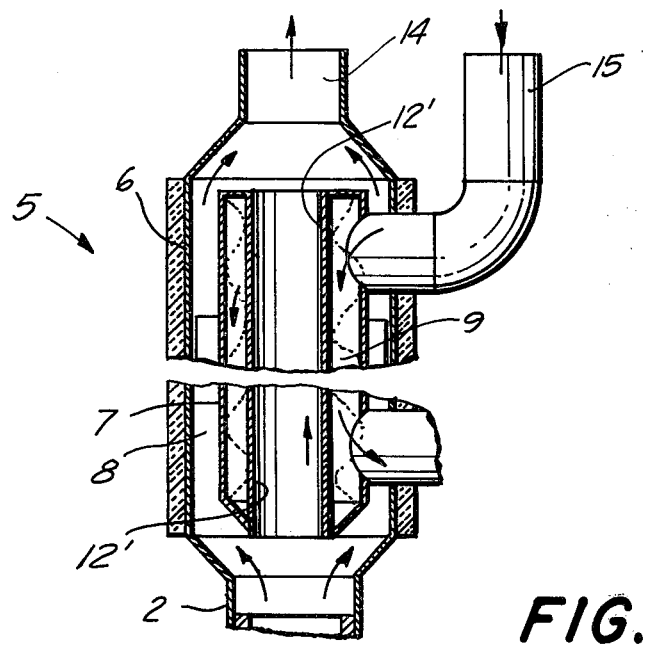
FIG. 3 is a fragmentary cross section of a modification of the device of FIG. 1.

In practice, the air to be heated is passed into the housing 3b via the inlet 15, the annular space 9 and the outlet 16 in the downward direction while the hot exhaust gas for preheating the air rises from the outlet 2 through the chamber 8 to the outlet 14. To increase the efficiency of the apparatus and as illustrated in FIG. 3, the body 12' can communicate with the outlets 2 and 14 so that a parallel flow of the exhaust gas occurs within the space 8 and the passage 12" through the core tube 12. In this case, the passage 9 is flanked internally and externally by the streams of exhaust gas.

I claim:

1. In a fuel-fired radiant-heating tube assembly for an industrial furnace in which a radiant-heating tube has an end projecting through a furnace wall, a fuel-feed pipe extending into said tube at said end, a combustion air fitting at said end for delivering air to said tube, and an exhaust gas outlet at said end for leading combustion exhaust gas from said tube, the improvement which comprises:
   an acoustic damper connected to said outlet, said damper including
      an elongated insulated outer shell,
      an elongated inner shell disposed in said outer shell and defining an elongated outer annular passage therewith, and
      a core body disposed in said inner shell and spaced therefrom to define within said inner shell an elongated annular inner core passage;
   means connecting said outer passage to said outlet for traversal by said exhaust gas;
   means connecting said inner passage to said fitting for traversal by said air whereby said air is preheated in said other passage in indirect heat exchange through the wall by said inner shell by said exhaust gas; and
   thermally conductive acoustic-damping elements in said outer passage for limiting sound generation by said exhaust gas and conducting heat to said inner passage.

2. The improvement defined in claim 1 wherein said elements are radially-extending vanes connected to said inner shell.

3. The improvement defined in claim 1, further comprising a thermally and acoustically-insulating layer on said outer shell.

4. The improvement defined in claim 1 wherein said core passage is provided with corrugated wire mesh having corrugations extending in the flow direction of said air.

5. The improvement defined in claim 1 wherein said body is hollow and is traversed by said exhaust gas in parallel with the flow thereof through said annular passage.

6. The improvement defined in claim 1 wherein said body and said shells are mutually coaxial.